(12) United States Patent
Scommegna et al.

(10) Patent No.: US 12,502,255 B2
(45) Date of Patent: Dec. 23, 2025

(54) DEVICE AND APPLIANCE FOR MANDIBULAR ADVANCEMENT AND PROCESS FOR MAKING A DEVICE FOR MANDIBULAR ADVANCEMENT

(71) Applicant: LEONE S.P.A., Sesto Fiorentino (IT)

(72) Inventors: Gabriele Scommegna, Tavernuzze Impruneta (IT); Maurizio Dolfi, Florence (IT)

(73) Assignee: LEONE S.P.A., Sesto Fiorentino (IT)

( * ) Notice: Subject to any disclaimer, the term of this patent is extended or adjusted under 35 U.S.C. 154(b) by 282 days.

(21) Appl. No.: 16/304,768

(22) PCT Filed: Jul. 31, 2017

(86) PCT No.: PCT/IT2017/000161
§ 371 (c)(1),
(2) Date: Nov. 27, 2018

(87) PCT Pub. No.: WO2018/025284
PCT Pub. Date: Feb. 8, 2018

(65) Prior Publication Data
US 2021/0220090 A1 Jul. 22, 2021

(30) Foreign Application Priority Data
Aug. 4, 2016 (IT) .................... 102016000082134

(51) Int. Cl.
*A61C 7/36* (2006.01)
*A61C 7/08* (2006.01)
*A61F 5/56* (2006.01)
(52) U.S. Cl.
CPC .................. *A61C 7/36* (2013.01); *A61C 7/08* (2013.01); *A61F 5/56* (2013.01); *A61F 5/566* (2013.01)

(58) Field of Classification Search
CPC .. A61F 5/56; A61F 5/566; A61F 2002/30991; A61F 2005/563;
(Continued)

(56) References Cited

U.S. PATENT DOCUMENTS

| 5,443,384 | A | * | 8/1995 | Franseen | A61C 7/00 433/18 |
| 6,604,527 | B1 | * | 8/2003 | Palmisano | A61C 7/08 128/859 |

(Continued)

FOREIGN PATENT DOCUMENTS

| DE | 202005007981 U1 | 8/2005 |
| EP | 1094761 A1 | 5/2001 |

(Continued)

OTHER PUBLICATIONS

International Search Report and Written Opinion of the International Search Authority issued on Dec. 22, 2017 in corresponding International application No. PCT/IT2017/000161; 10 pages.

*Primary Examiner* — Ophelia A Hawthorne
*Assistant Examiner* — Michael Milo
(74) *Attorney, Agent, or Firm* — Maier & Maier, PLLC

(57) ABSTRACT

A device for the mandibular advancement, a process for making an appliance for the mandibular advancement and the appliance realized. The device includes a first engagement element associable with the lower dental arch or mandible and a second engagement element associable with the upper dental arch or maxilla. The engagement elements are provided with a first inclined engagement surface and a second inclined engagement surface for determining said mandibular advancement. The first engagement element includes a core covered by a covering body provided with a pocket adapted to the housing of the core, the second engagement element includes an orthodontic screw adapted to determine the displacement of the second inclined plane, (Continued)

the core having an inclined portion destined to define, in cooperation with the respective covering, the first inclined engagement surface.

16 Claims, 2 Drawing Sheets

(58) Field of Classification Search
CPC ... A61F 2/2803; A61B 5/1072; A61B 5/1076; A61B 5/4557; A61B 5/481; A61B 5/4818; A61B 5/097; A61B 5/4812; A61B 17/8071; A63B 71/085; A63B 2071/086; A61C 19/045; A61C 11/00; A61C 7/08; A61C 7/36; A61C 9/0006; Y10S 602/902

USPC .................. 128/848, 859, 861; 602/902
See application file for complete search history.

(56) References Cited

U.S. PATENT DOCUMENTS

| | | | |
|---|---|---|---|
| D827,835 S * | 9/2018 | Bocala | D24/180 |
| 2013/0112210 A1* | 5/2013 | Stein | A61F 5/566 |
| | | | 128/848 |
| 2015/0157491 A1* | 6/2015 | Hofmann | A61F 5/566 |
| | | | 128/848 |
| 2015/0272773 A1* | 10/2015 | Rico | A61F 5/566 |
| | | | 128/848 |
| 2016/0199216 A1* | 7/2016 | Cam | A61F 5/566 |
| | | | 128/848 |
| 2017/0035534 A1* | 2/2017 | Ross | A61F 5/56 |
| 2018/0168845 A1* | 6/2018 | Hofmann | A61F 5/05891 |

FOREIGN PATENT DOCUMENTS

| | | |
|---|---|---|
| EP | 2881091 A1 | 6/2015 |
| KR | 20100069085 A | 6/2010 |
| SU | 1438759 A1 | 11/1988 |

* cited by examiner

DEVICE AND APPLIANCE FOR MANDIBULAR ADVANCEMENT AND PROCESS FOR MAKING A DEVICE FOR MANDIBULAR ADVANCEMENT

FIELD

The present invention relates to a mandibular advancement device especially for the treatment of nighttime snoring and nighttime apnea, a process for the manufacture of a mandibular advancement device and the associated appliance.

Various devices are known to limit snoring, that are used to eliminate or at least to reduce this phenomenon. Such devices are differently shaped according to their mode of use.

BACKGROUND

A known anti-snoring device is made up of an adhesive plaster applicable to the nose and having wings that improve the patency of the nostrils. Other devices destined to be applied to the nose include structures to be inserted inside the nostrils to enlarge them. In either cases, due to continuous contact with particularly sensitive parts of the body, such devices can be uncomfortable for the user.

There are also devices that help keep the user's mouth close to increase nasal breathing. Generally, such devices include adhesive large adhesive plasters to be applied during sleep at or near the mouth. However, the continuous contact of the plaster with the skin can be uncomfortable for the user.

Other devices are applied to the body to force the user to take certain positions during sleep; for example, a known device comprises a kind of shaped pillow to be applied with belts to the back of the user to prevent posture in the supine position. This device may also be uncomfortable to use, especially due to its encumbrance.

An alternative to the aforesaid devices is represented by the mandibular advancement devices. In fact, many people suffering from night-time obstructive snoring and apnea are subjected to a mandibular retraction when they are sleeping, accompanied by a tongue "fall" in the back causing obstruction of the upper airways at the oral segment of the pharynx. The devices described below keep the lower jaw more suitably positioned in relation to the upper jaw, thus eliminating the aforementioned drawbacks. A mandibular advancement device, called "Twin Block", was conceived in the 1970s by Dr. Williams Jim Clark and includes two bodies known as "blocks", with opposed inclined planes, which are fixed to the lower and upper dental arches to exert a suitable thrust.

Patent documents EP-1094761, U.S. Pat. No. 5,443,384 and SU1438759 also disclose devices providing a mandibular positioning.

SUMMARY

The mandibular advancement devices described above require a substantially artisanal final design that requires a specific and customized intervention of a technician, with procedures that can be also highly differentiated between the various cases. In other words, these devices are not fully compatible with large-scale production in a repeatable way as they involve many stages of their implementation necessarily linked to the dedicated intervention of the technician.

The object of the present invention is to provide a mandibular advancing device for use in the treatment of nighttime snoring and apnea, i.e. an oral device for preventing, eliminating or reducing snoring and nighttime sleep apnea, capable of solving the aforementioned drawbacks. The device of the invention allows for the maintenance of a suitable advanced position of the lower jaw and can be realized in large scale, i.e. its entire production process (design, prototyping manufacture of the final product) is not affected by the drawbacks of the substantially artisanal production. The production process of the present invention also provides advantages in the replacement of parts that, for example, are subject to wearing or failure.

Among the advantages of the present invention is the fact that the lower jaw is prevented from moving it is prevented from moving backwards with a device comprising a first engagement element that can be associated with the lower dental arch (or mandible) and a second engagement element that can be associated with the upper dental arch (or the upper jaw), said engagement elements being provided with respective opposing and suitably inclined engagement surfaces which, when the device is in a use configuration, are in contact with each other and prevent the reciprocal displacement along the anteroposterior direction.

According to the present invention, at least one of the engagement elements consists of a mechanically resistant core, i.e. made of a metal of the type used for making orthodontic for expansion screws, and a cover or shell of a softer material, for example plastic material, the shell being replaceable in case of damage and/or variation of the type of action to be exerted.

Advantageously, a device according to the invention comprises a part having an invariable or standardized shape consisting of two engagement elements, and a customized part, constituted by the corresponding support structures to be associated with the dental arches that are conformed to the specific characteristics of the user dental arches.

This device is particularly effective because it determines the correct positioning of the lower jaw with respect to the upper jaw during sleep, naturally and with reduced invasiveness comparable to that of a bite for bruxism treatment.

BRIEF DESCRIPTION OF THE DRAWINGS

These and further advantages and features of the present invention will be more and better understood by anyone skilled in the art from the following description and with the aid of the attached drawings, which provide a practical example of the invention but are not to be considered in a limitative sense, in which.

DETAILED DESCRIPTION

Figure 1:
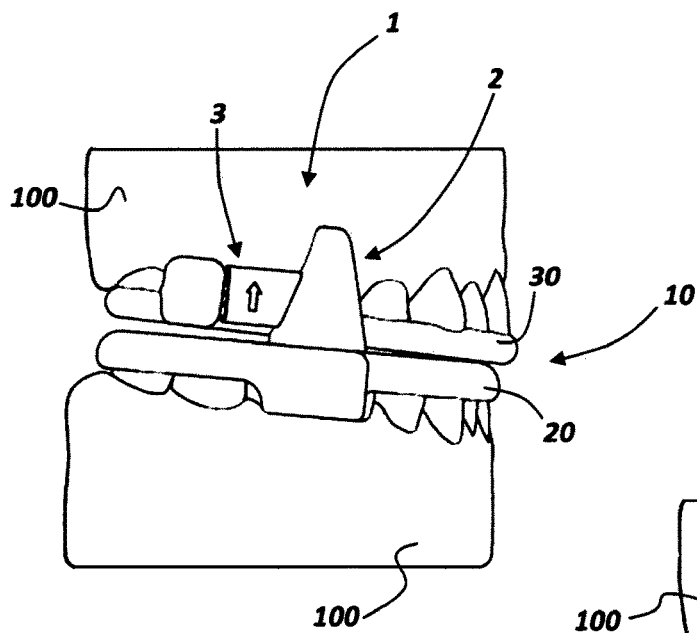
FIG. 1 shows in a schematic lateral view, a model with the lower and upper arches to which an apparatus having a device made in accordance with the invention is associated, the device being represented in a minimum expansion configuration.
Figure 2:
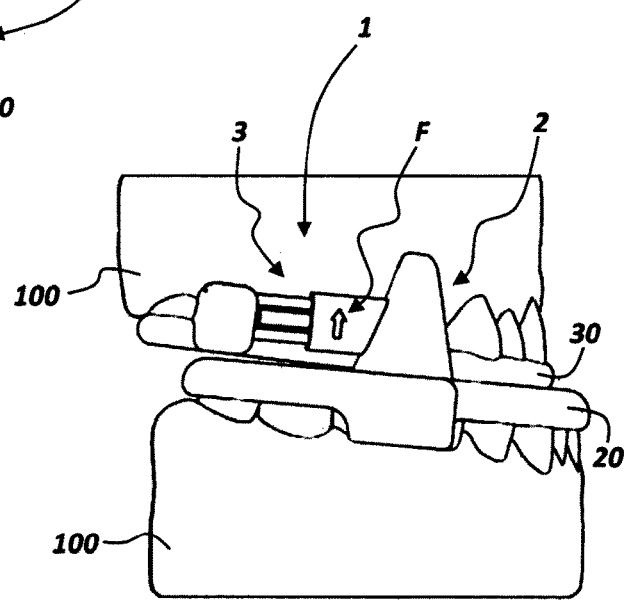
FIG. 2 shows FIG. 1 in a maximum expansion configuration.
Figure 4:
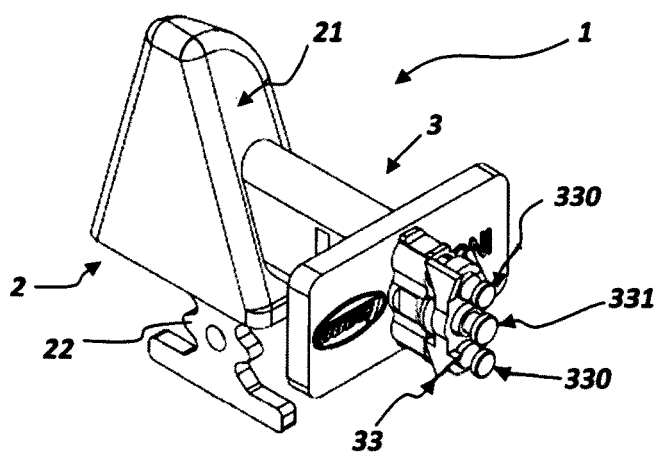
FIG. 4 is a perspective view with the two engagement elements joined together.
Figure 3:
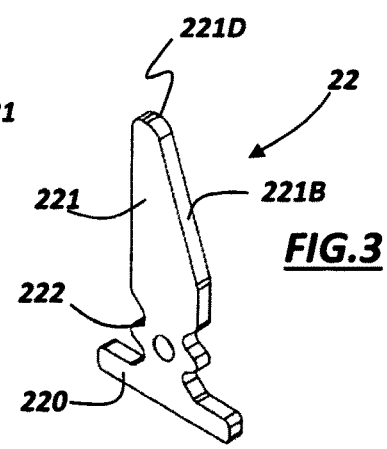
FIG. 3 is a schematic perspective view of a possible example of a core for an engagement element.
Figure 5:
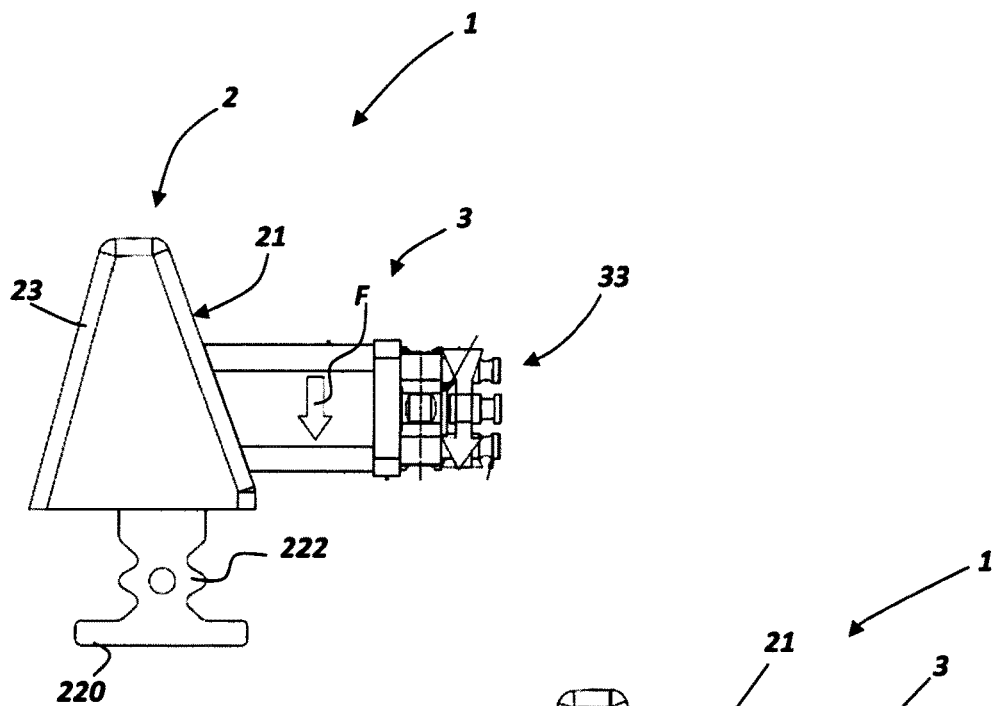
FIG. 5 is a side view with the two engagement elements joined.
Figure 6:
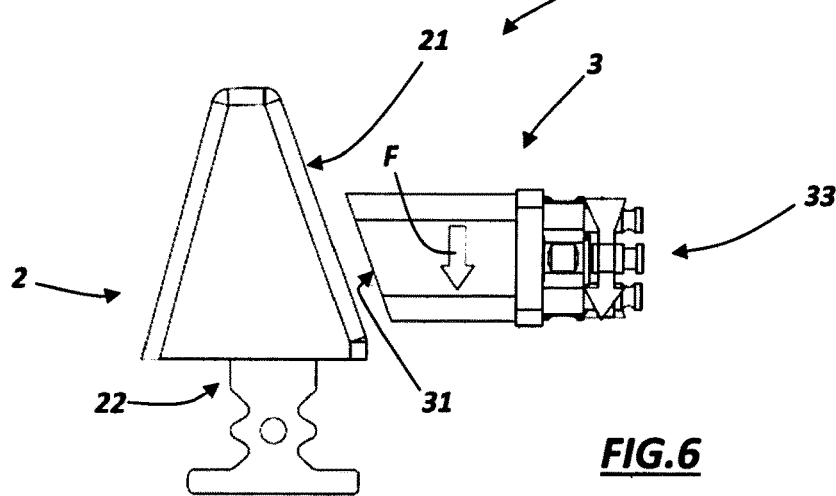
FIG. 6 is a side view with the two elements represented as separated elements.

As mentioned above, and with reference to the accompanying drawings, the device object of the invention is of the type that uses the interaction between two engagement elements to define a constraint that keeps the lower jaw in an advanced position thanks to the shape of mutually opposite tilted surfaces. The device (1) can be used to equip an appliance (10) which, in FIGS. 1 and 2, is schematically represented in association with an orthodontic model (100).

In particular, the device comprises a first engagement element (2) associated with the lower dental arch (that is, the lower jaw) and a second engagement element (3) associated with the upper dental arch (that is, the upper jaw).

The first engagement element (2) is supported by a first resin structure (20) which can be fitted on the teeth of the corresponding lower dental arch.

Similarly, the second engagement element (3) is supported by a second resin structure (30) which can be fitted on the teeth of the upper dental arch.

Both the support structures (20, 30) of the engagement elements (2, 3) will preferably be shaped to copy the teeth profile to optimize the association between the device (1) and the two dental arches.

The part of the apparatus (10) comprising the two structures (20) and (30) can therefore be realized according to the specific characteristics of the dental arches of the user. Supporting structures (20, 30) can be made either manually or with CAD/CAM techniques in a known manner to be customized according to the characteristics of the dental arches and the oral cavity.

The devices (1) will be provided bilaterally on the device (10) on both support structures (20, 30), so that they act both on the left and right of the dental arch.

Figure 7:
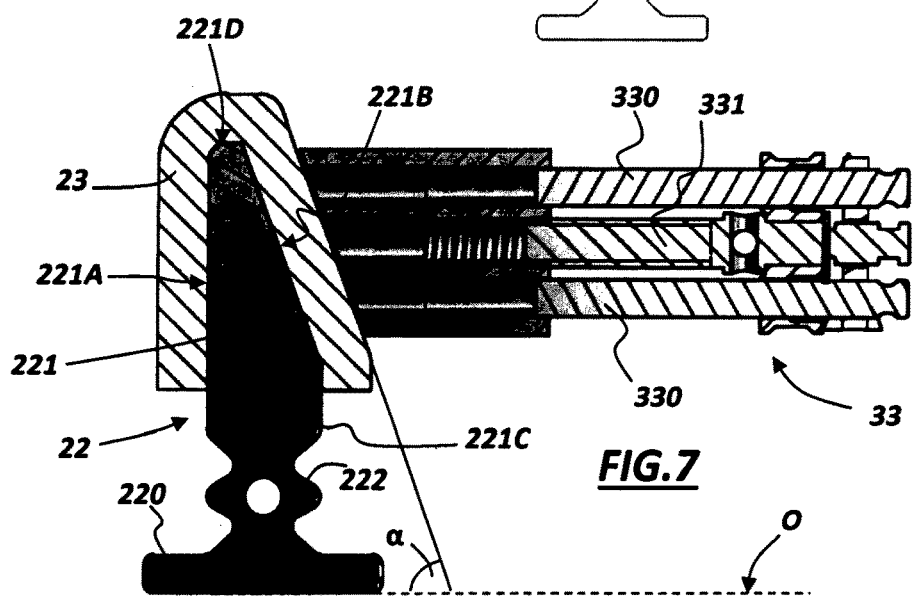
FIG. 7 is a side view with parts represented in section according to a hypothetical vertical plane of the device.

As disclosed above, the engagement elements (2, 3) are provided with respective opposite and suitably inclined engagement surfaces that, when the device is in the use configuration, are in contact with each other in order to maintain the lower dental arch in an advanced position with respect to the upper dental arch, as schematically shown in FIG. 2. The angle of inclination (a) of the engagement surfaces can be about 70° with respect to the chewing or occlusal plane. In FIG. 7, the angle (a) representing the inclination of the surfaces (21) and (31) (which will be described below) is schematically represented in relation to the chewing or occlusal plane (O) that in the drawing is horizontal.

In particular, the lower engagement element (2) has an inclined surface, that is a first sloping plane (21) abutting against a corresponding inclined surface or second sloping plane (31) of the upper engagement element (3).

According to the present invention, the first engagement element (2) (which is arranged below in the examples as illustrated) comprises a mechanically resistant core (22), that is made of metal of the type normally used for making orthodontic expansion screws, and a softer covering body material (for example resin). The core (22) has a base (220) which is completely embedded in the corresponding base portion of the supporting structure (20) that defines the lower part of the "bite" and a wing-shaped upper part (221) that is also coated by the resin (the resin coating is indicated by 23 in the drawings) and that defines the inclined surface (21) intended to engage the corresponding inclined surface (31) of the other engaging element (3).

With reference to the drawings, the top (221) of the core (22) is shaped like a wing with a substantially triangular prismatic shape, substantially defining a triangular plate with a rounded vertex. In particular, the rectangular triangle defining the lateral view of the upper part (221), i.e. a longitudinal section thereof, comprises a vertical major cathetus (221A), a hypotenuse (221B), and a minor cathetus (221C) which constitutes the connection with the base (220), through the joint portion (222). The major cathetus (221A) and the hypotenuse (221B) are connected by a rounded portion (221D) defining the vertex between the two sides and the top of the upper part (221) of core (22).

Advantageously, the core (22) has the shape of triangular plate that contributes to optimizing the mechanical strength of the device (1). In fact, the forces due to the interaction between the two engagement elements are correctly transmitted by the device thus increasing the therapeutic action of the latter.

According to the example illustrated in the drawings, the core (22) is fixed to the lower structure (20), while the second engaging element (3) can be moved with respect to the upper structure (30) so as to adjust the thrust that is achieved between the two engagement elements. The second engagement element (3) is secured to the corresponding second supporting structure (30) by means of an orthodontic expansion screw unit (33) that is provided in a known manner with two stems or guides (330) and a central drive screw (331) which adjusts the longitudinal variation of the orthodontic screw unit.

In practice, by acting on the screw unit (33), it is possible to adjust the value of the displacement to be obtained, that is, the value of the mandible advancement (lower dental arch) relative to the upper jaw (upper dental arch).

The two expansion screw units (33), which are located to the right and left at the two sides of the upper dental arch, are preferably activated by acting on the respective drive screws according to a predetermined direction (e.g. upward) with respect to the occlusal plane following the indication shown by the arrow (F) stamped on the upper engagement element (3).

In this way, of the two drive screws (and their respective female screws in in the engagement mobile element) one must be right-handed and the other is left-handed.

The activation and adjustment of the device (1) and the respective appliance (10) is considerably simplified and is suitable to allow the use by even unskilled persons, by limiting the possibility (in practice, excluding) of an incorrect maneuvering.

According to the invention, an extremely robust mandibular advancement device is provided because it has a metal inner core.

The present device is particularly effective due to the arrangement of tilted planes (for a preferred value of 70°) defined by the surfaces (21) and (31), planes which are substantially parallel to each other and allow a correct and complete transmission of the forces.

Advantageously, in case of damage, the device (1) allows the body (23) covering the core (22) to be replaced easily and safely. The body (23) is thus provided with a shaped pocket adapted to receive the core (22).

The present invention also relates to a method for making an appliance (10) for mandibular advancement and as well as the appliance (10).

In accordance with the method of the present invention, a mandibular advancement appliance (10) is of the type provided with a device comprising a first engaging member (2) associated with the lower or mandibular dental arch and a second engaging element (3) connectable to the upper dental arch or upper jaw; the engagement elements (2, 3) are provided with inclined engagement surfaces (21,31) for determining said mandibular advancement; the appliance (10) realized according to the present invention comprises a device (1) made as described above.

In practice, the appliance (10) comprises a standardized part, consisting of two engagement elements (2, 3), and a customized part, constituted by the two structures (20) and (30), which are conformed to the specific characteristics of the user.

A method for making a mandibular advancement appliance (10) according to the present invention provides that the first engagement element (2) and the second engaging member (3) have a standardized, that is, a predetermined conformation that does not depend on the specific anatomy of the dental arches and the user's oral cavity. Obviously, it may be possible to foresee dimensional variations depending on the type of use, for example, determining a plurality of sizes depending on the size of the arches and/or the oral cavity to be equipped. The configuration of these engagement elements (2, 3) forming the device (1) is therefore fixed and does not vary in relation to the user. The personalization of the appliance (10) is achieved by the formation of the structures (20) and (30) which can be shaped in a manner similar to a bite, for example manually or with computerized techniques.

Of course, the invention is not limited to what is described and illustrated, but can be largely modified with respect to the nature and arrangement of the materials used without departing from the inventive teaching set forth above and subsequently claimed.

The invention claimed is:

1. A device for mandibular advancement, comprising:
a first engagement element configured to be associated with a lower dental arch or mandible; and
a second engagement element configured to be associated with an upper dental arch or maxilla, said first and second engagement elements provided with a first inclined engagement surface and a second inclined engagement surface adapted to determine mandibular advancement, wherein the first engagement element comprises a core, formed by a single body, covered by a covering body provided with a triangular pocket adapted to provide a housing to said core and without any further recesses, said core comprising an anterior-to-posterior longitudinally extending joint portion and an anterior side comprising a vertical major cathetus, said second engagement element comprises an orthodontic screw adapted to determine displacement of the second inclined engagement surface, said core having an inclined portion destined to define, in cooperation with the covering body, said first inclined engagement surface, and an upper portion of said core is a triangular plate having a predetermined triangular shape with a rounded vertex, having an inclined side in correspondence to said first inclined engagement surface, wherein the upper portion of said core maintains the predetermined triangular shape when positioned inside the covering body, and the triangular upper portion of said core is completely embedded in the triangular pocket of the covering body, wherein said first engagement element and said second engagement element have a standardized conformation that is dimensioned to not depend on a specific anatomy of the dental arches and of an oral cavity of a user;
wherein said core of the first engagement element is constituted by a metal material and the covering body is constituted by a soft material covering, and wherein the covering body is replaceable.

2. The device according to claim 1, wherein said first engagement element is supported by a first structure adapted to be fitted on teeth of the corresponding lower dental arch, the second engagement element being supported by a second structure with respect to which it is movable by said orthodontic screw and said core has a base completely embedded in a corresponding base portion of said first supporting structure.

3. The device according to claim 2, wherein said core of said first engagement element comprises the upper portion received in said covering body and a base portion embedded in said first structure that can be fitted on the teeth of the corresponding lower dental arch and said base portion is joined to the upper portion through an intermediate joint portion, the upper portion, the base portion and the intermediate joint portion forming a unitary body.

4. The device according to claim 1, wherein the core is made of metal, and the covering body is made of a material softer than metal.

5. The device according to claim 4, wherein the covering body is made of resin or plastic.

6. The device according to claim 1, wherein said inclined first inclined engagement surface and second inclined engagement surface are inclined by a value equal to 70° with respect to an occlusal or masticatory plane.

7. The device of claim 1, further comprising:
an expansion screw placed on a right portion of the upper dental arch; and
an expansion screw placed on a left portion of the upper dental arch, wherein the expansion screws are configured to be activated by tightening a set of male screws in one direction with respect to an occlusal plane.

8. The device according to claim 1, wherein said first engagement element is supported by a first structure adapted to be fitted on teeth of the corresponding lower dental arch and the second engagement element being supported by a second structure with respect to which it is movable by said orthodontic screw and wherein said first structure and said second structure are made manually or with computerized techniques, and dimensioned to depend on characteristics of the dental arches and the oral cavity of the user.

9. A method for making a mandibular advancement appliance comprising a device for mandibular advancement, comprising a first engagement element configured to be associated with a lower dental arch or mandible and a second engagement element configured to be associated with an upper dental arch or maxilla,
wherein the first engagement element is supported by a first structure which can be fitted on the teeth of the corresponding lower dental arch and the second engagement element is supported by a second structure which can be fitted on the teeth of the upper dental arch,
wherein the first engagement element and the second engagement member have a standardized, that is, a predetermined conformation that does not depend on the specific anatomy of the dental arches and the user's oral cavity and wherein the method comprises a personalization of the mandibular advancement appliance that is achieved by a formation of the first and the second structures which are shaped in a manner similar to a bite, for example manually or with computerized techniques;
wherein said first and second engagement elements provided with a first inclined engagement surface and a second inclined engagement surface adapted to determine mandibular advancement, wherein the first engagement element comprises a core, formed by a single body, covered by a covering body provided with a triangular pocket adapted to provide a housing to said core and without any further recesses, said core comprising an anterior-to-posterior longitudinally extending joint portion and an anterior side comprising a vertical major cathetus, said second engagement element comprises an orthodontic screw adapted to determine displacement of the second inclined engagement surface, said core having an inclined portion destined to define, in cooperation with the covering body, said first inclined engagement surface, and an upper portion of said core is a triangular plate having a predetermined triangular shape with a rounded vertex, having an inclined side in correspondence to said first inclined engagement surface, wherein the upper portion of said core maintains the predetermined triangular shape when positioned inside the covering body, and the triangular upper portion of said core is completely embedded in the triangular pocket of the covering body, wherein said first engagement element and said second engagement element have a standardized conformation that is dimensioned to not depend on a specific anatomy of the dental arches and of an oral cavity of a user; and wherein said core of the first engagement element is constituted by a metal material and the covering body is constituted by a soft material covering, and wherein the covering body is replaceable.

10. The method for making a mandibular advancement appliance according to claim 9, wherein said first engagement element is supported by a first structure adapted to be fitted on teeth of the corresponding lower dental arch, the second engagement element being supported by a second structure with respect to which it is movable by said orthodontic screw and said core has a base completely embedded in a corresponding base portion of said first supporting structure.

11. The method for making a mandibular advancement appliance according to claim 10, wherein said core of said first engagement element comprises the upper portion received in said covering body and a base portion embedded in said first structure that can be fitted on the teeth of the corresponding lower dental arch and said base portion is joined to the upper portion through an intermediate joint portion, the upper portion, the base portion and the intermediate joint portion forming a unitary body.

12. The method for making a mandibular advancement appliance according to claim 9, wherein the core is made of metal, and the covering body is made of a material softer than metal.

13. The method for making a mandibular advancement appliance according to claim 12, wherein the covering body is made of resin or plastic.

14. The method for making a mandibular advancement appliance according to claim 9, wherein said inclined first inclined engagement surface and second inclined engagement surface are inclined by a value equal to 70° with respect to an occlusal or masticatory plane.

15. The method for making a mandibular advancement appliance according to claim 9, wherein the device comprises:
    an expansion screw placed on a right portion of the upper dental arch; and
    an expansion screw placed on a left portion of the upper dental arch, wherein the expansion screws are configured to be activated by tightening a set of male screws in one direction with respect to an occlusal plane.

16. The method for making a mandibular advancement appliance according to claim 9, wherein said first engagement element is supported by a first structure adapted to be fitted on teeth of the corresponding lower dental arch and the second engagement element being supported by a second structure with respect to which it is movable by said orthodontic screw and wherein said first structure and said second structure are made manually or with computerized techniques, and dimensioned to depend on characteristics of the dental arches and the oral cavity of the user.

* * * * *